US012671030B2

(12) United States Patent
Yoo et al.

(10) Patent No.: US 12,671,030 B2
(45) Date of Patent: Jun. 30, 2026

(54) MULTILAYER ELECTRONIC COMPONENT

(71) Applicant: SAMSUNG ELECTRO-MECHANICS CO., LTD., Suwon-si (KR)

(72) Inventors: Won Hee Yoo, Suwon-si (KR); Young Hoon Song, Suwon-si (KR); Hyun Woo Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 123 days.

(21) Appl. No.: 18/527,814

(22) Filed: Dec. 4, 2023

(65) Prior Publication Data

US 2024/0212933 A1 Jun. 27, 2024

(30) Foreign Application Priority Data

Dec. 23, 2022 (KR) ........................ 10-2022-0183415

(51) Int. Cl.
*H01G 4/012* (2006.01)
*H01G 4/30* (2006.01)

(52) U.S. Cl.
CPC ............... *H01G 4/012* (2013.01); *H01G 4/30* (2013.01)

(58) Field of Classification Search
CPC ................................. H01G 4/30; H01G 4/012
See application file for complete search history.

(56) References Cited

U.S. PATENT DOCUMENTS

| | | | |
|---|---|---|---|
| 11,295,897 B2 | 4/2022 | Kwon et al. | |
| 2014/0311783 A1* | 10/2014 | Lee | H01G 4/005 |
| | | | 361/321.2 |
| 2014/0326494 A1* | 11/2014 | Chung | H01G 4/30 |
| | | | 361/301.4 |
| 2015/0131199 A1 | 5/2015 | Park et al. | |
| 2020/0027661 A1* | 1/2020 | Park | H01G 4/12 |
| 2020/0075242 A1* | 3/2020 | Kang | H01G 4/224 |

(Continued)

FOREIGN PATENT DOCUMENTS

| | | |
|---|---|---|
| CN | 110739151 A | 1/2020 |
| CN | 111599593 A | 8/2020 |

(Continued)

OTHER PUBLICATIONS

Extended European Search Report issued on May 13, 2025 in European Patent Application No. 23213943.6 (Note: JP2000124057A cited therein is already of record.).

*Primary Examiner* — Michael P McFadden
(74) *Attorney, Agent, or Firm* — Morgan, Lewis & Bockius LLP

(57) ABSTRACT

A multilayer electronic component includes a body including two or more unit electrode stacks, each unit electrode stack including a dielectric layer and internal electrodes alternately disposed with the dielectric layer in a first direction, wherein the two or more unit electrode stacks are arranged in a line in the first direction, a width of internal electrodes disposed in an upper portion of each unit electrode stack in the first direction among the internal electrodes and a width of internal electrodes disposed in a lower portion of each unit electrode stack in the first direction among the internal electrodes are smaller than a width of the internal electrodes disposed in a central portion in the first direction.

16 Claims, 7 Drawing Sheets

(56)  References Cited

U.S. PATENT DOCUMENTS

| | | | | |
|---|---|---|---|---|
| 2020/0152391 A1* | 5/2020 | Kang | ........................ | H01G 4/12 |
| 2020/0265998 A1* | 8/2020 | Kwon | ....................... | H01G 4/12 |
| 2021/0366658 A1* | 11/2021 | Yamato | ................ | H01G 4/1227 |
| 2022/0181085 A1 | 6/2022 | Kim et al. | | |
| 2023/0080684 A1* | 3/2023 | Kim | ......................... | H01G 4/30 |
| | | | | 361/321.2 |

FOREIGN PATENT DOCUMENTS

| | | | |
|---|---|---|---|
| JP | 11-297566 A | | 10/1999 |
| JP | 2000124057 A | * | 4/2000 |
| KR | 10-2015-0053424 A | | 5/2015 |
| KR | 10-2020-0101816 A | | 8/2020 |

* cited by examiner

<u>10</u>

121
111
122
UE''

FIRST
DIRECTION

THIRD
DIRECTION

MULTILAYER ELECTRONIC COMPONENT

CROSS-REFERENCE TO RELATED APPLICATION

This application claims benefit of priority to Korean Patent Application No. 10-2022-0183415 filed on Dec. 23, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), which is a multilayer electronic component, is a chip-type capacitor mounted on the printed circuit boards of various types of electronic products, such as imaging devices including liquid grain displays (LCDs) and plasma display panels (PDPs) , computers, smartphones, cell phones, and the like, to allow electricity to be charged therein and discharged therefrom.

Such an MLCC may be used as a component of various electronic devices due to advantages thereof, such as compactness, guaranteed high capacitance, and ease of mounting, and as various electronic devices, such as computers and mobile devices have been reduced in size and increased in power, demand for miniaturization and high capacitance of multilayer ceramic capacitors have been increased. In addition, as the application to automotive electric portions and the like has increased, high reliability in various environments is required.

Internal electrodes, which provide an area for charging charges in the multilayer ceramic capacitor, are generally vertically stacked with the same overlapping pattern shape.

Based on a W-T (with-thickness) cross-section of the multilayer ceramic capacitor, a triple point at which a capacitance forming portion in which internal electrodes and a dielectric layer are alternately disposed, a cover portion, and a side margin portion contact each other is relatively vulnerable to cause a problem, such as cracks.

In particular, during the sintering process, as sintering shrinkage first occurs in the thickness direction of the internal electrode, a phenomenon in which a central portion of the body in the width direction is concave may occur, and stress due to sintering may be concentrated near the triple point at which the capacitance forming portion, the cover portion, and the side margin portion contact each other to cause cracks or the like.

Therefore, it is necessary to develop a multilayer ceramic capacitor having a structure capable of suppressing the occurrence of cracks, delamination, etc. and relaxing stress due to sintering by controlling a sintering shrinkage behavior of the capacitance forming portion, the cover portion, and the side margin portion.

SUMMARY

An aspect of the present disclosure may provide a multilayer electronic component having excellent reliability.

An aspect of the present disclosure may also provide a multilayer electronic component having a structure capable of relaxing stress applied to a body.

According to an aspect of the present disclosure, a multilayer electronic component may include: a body including two or more unit electrode stacks, each unit electrode stack including a dielectric layer and internal electrodes alternately disposed with the dielectric layer in a first direction and the body including first and second surfaces facing each other in the first direction, third and fourth surfaces connected to the first and second surfaces and facing each other in a second direction, and fifth and sixth surfaces connected to the first to fourth surfaces and facing each other in a third direction; and external electrodes disposed on the body, wherein the two or more unit electrode stacks are arranged in a line in the first direction, and in a cross-section of each unit electrode stack in the first and third directions, a width of internal electrodes disposed in an upper portion of each unit electrode stack in the first direction among the internal electrodes and a width of internal electrodes disposed in a lower portion of each unit electrode stack in the first direction among the internal electrodes are smaller than a width of internal electrodes disposed in a central portion in the first direction among the internal electrodes, and unit electrode stack wherein an acute angle between a CL representing a line connecting ends of the internal electrodes disposed in the central portion of each unit electrode stack in the first direction and a UL representing a line connecting ends of the internal electrodes disposed in the upper portion of each unit electrode stack in the first direction and an acute angle between the CL and a LL representing a line connecting ends of the internal electrodes disposed in the lower portion of each unit electrode stack in the first direction are 20 degrees to 70 degrees.

According to another aspect of the present disclosure, a multilayer electronic component may include : a body including two or more unit electrode stacks, each unit electrode stack including a dielectric layer and internal electrodes alternately disposed with the dielectric layer in a first direction and the body including first and second surfaces facing each other in the first direction, third and fourth surfaces connected to the first and second surfaces and facing each other in a second direction, and fifth and sixth surfaces connected to the first to fourth surfaces and facing each other in a third direction; and external electrodes disposed on the body, wherein the two or more unit electrode stacks are arranged in a line in the first direction, and in a cross-section of each unit electrode stack in the first and third directions, a line connecting one end of each of each internal electrodes included in the unit electrode stack in a width direction, a line connecting the other end of each of the internal electrodes in the width direction, an uppermost internal electrode in the first direction, and a lowermost internal electrode in the first direction form an octagon.

BRIEF DESCRIPTION OF DRAWINGS

The above and other aspects, features and other advantages of the present disclosure will be more clearly understood from the following detailed description taken in conjunction with the accompanying drawings, in which.

3

Figure 5:
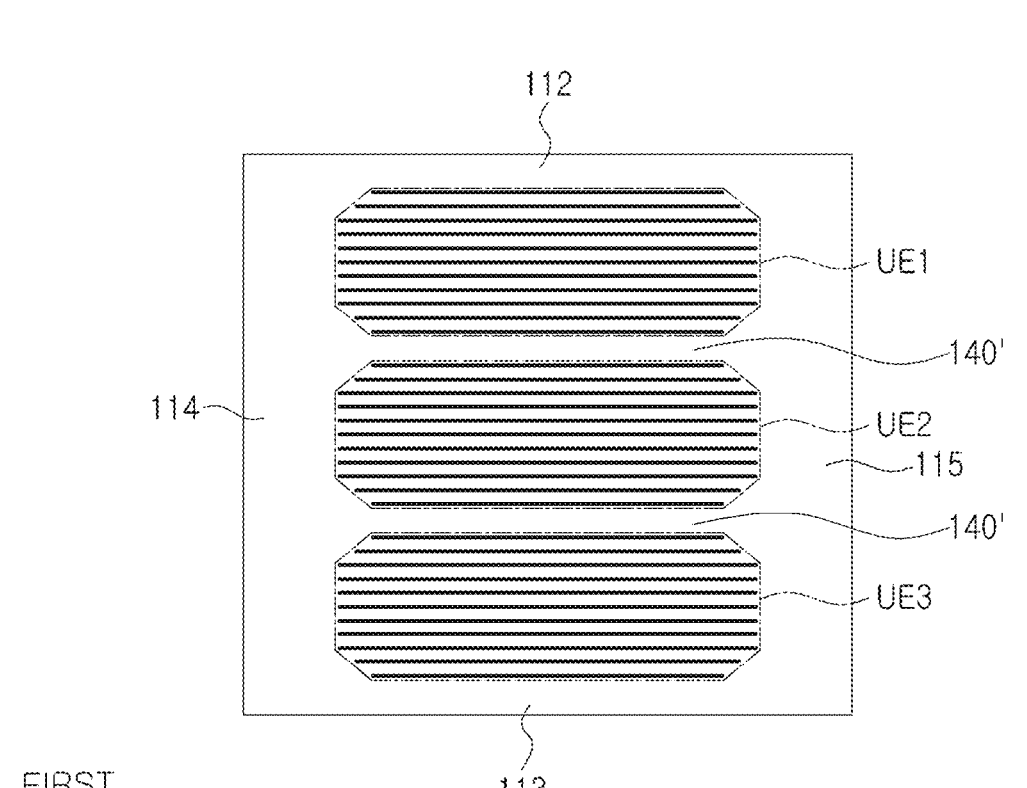
Figure 6:
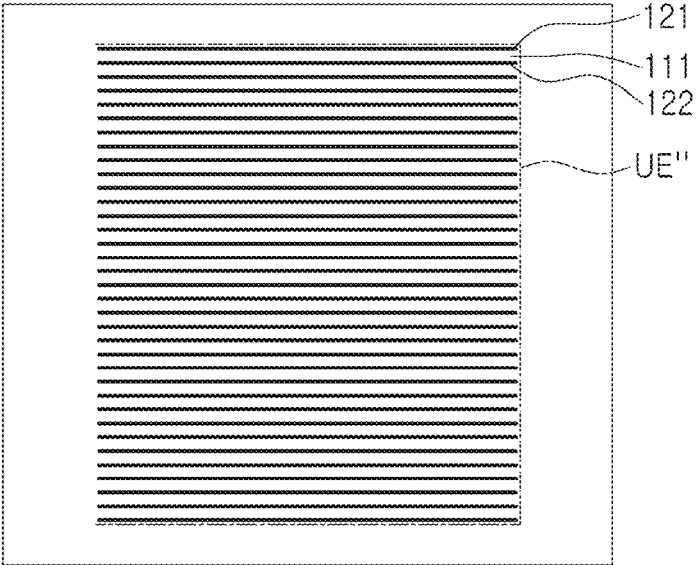
Figure 6:
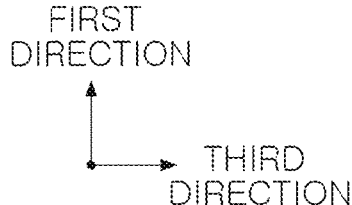
Figure 7:
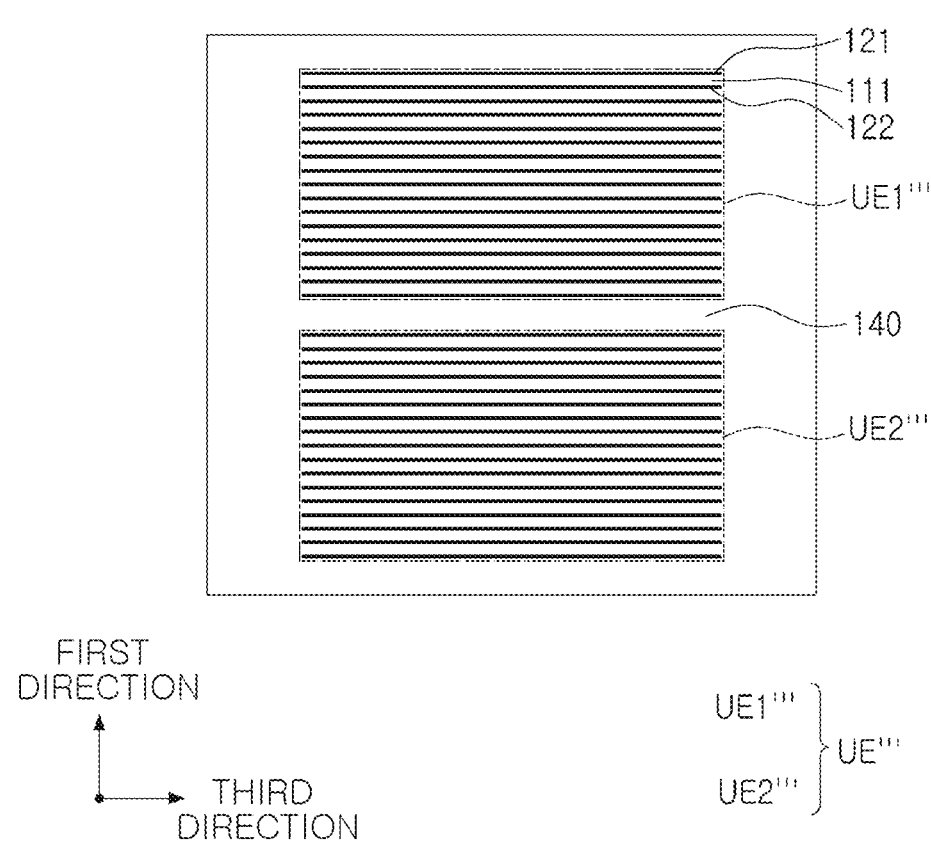

FIG. 5 is a view schematically illustrating cross-sections of a multilayer electronic component in first and third directions according to a modified example of the present disclosure;

FIG. 6 is a view schematically illustrating a cross-section of Comparative Example 1 in first and third directions; and FIG. 7 is a view schematically illustrating a cross-section of Comparative Example 2 in first and third directions.

DETAILED DESCRIPTION

Exemplary embodiments of the present disclosure will now be described in detail with reference to the accompanying drawings.

In the drawing, a first direction may be defined as a stacking direction or thickness (T) direction, a second direction may be defined as a length (L) direction, and a third direction may be defined as a width (W) direction.

Multilayer Electronic Component

Figure 1:
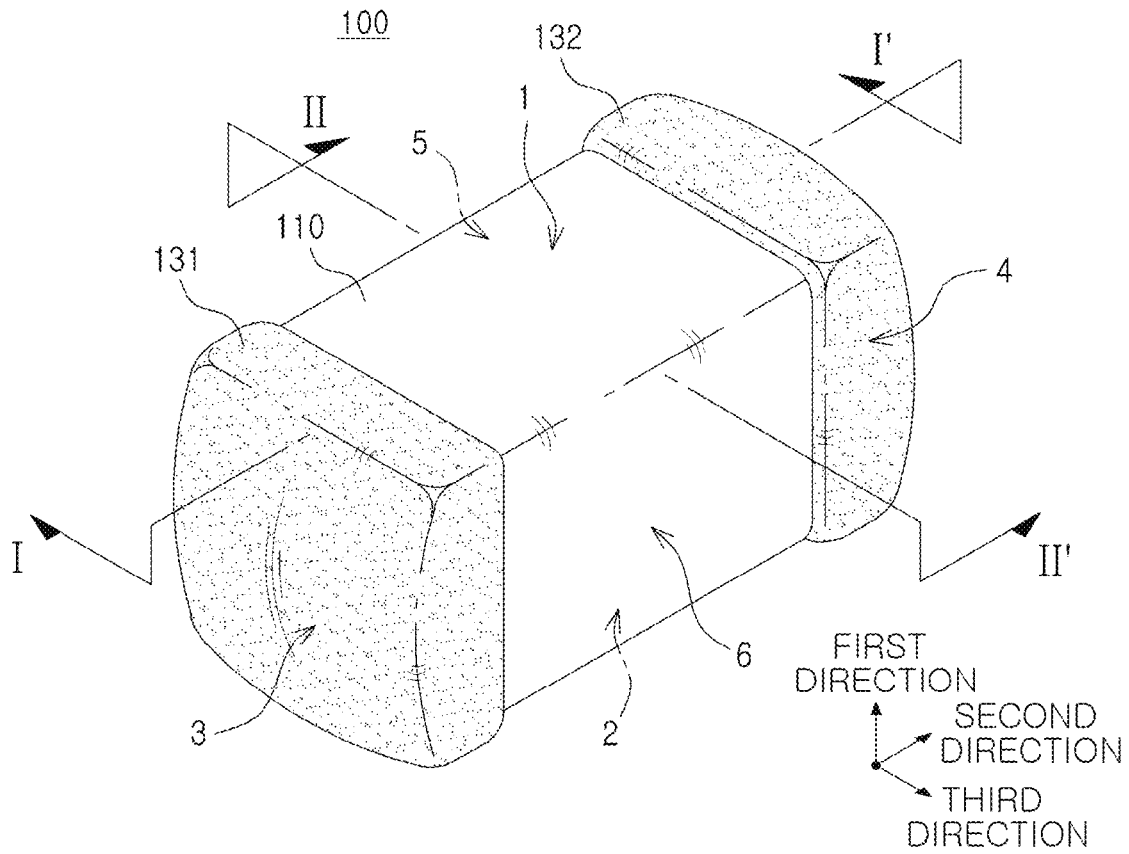
FIG. 1 is a perspective view schematically illustrating a multilayer electronic component according to an exemplary embodiment in the present disclosure.

FIG. 1 is a perspective view schematically illustrating a multilayer electronic component according to an exemplary embodiment in the present disclosure.

Figure 2:
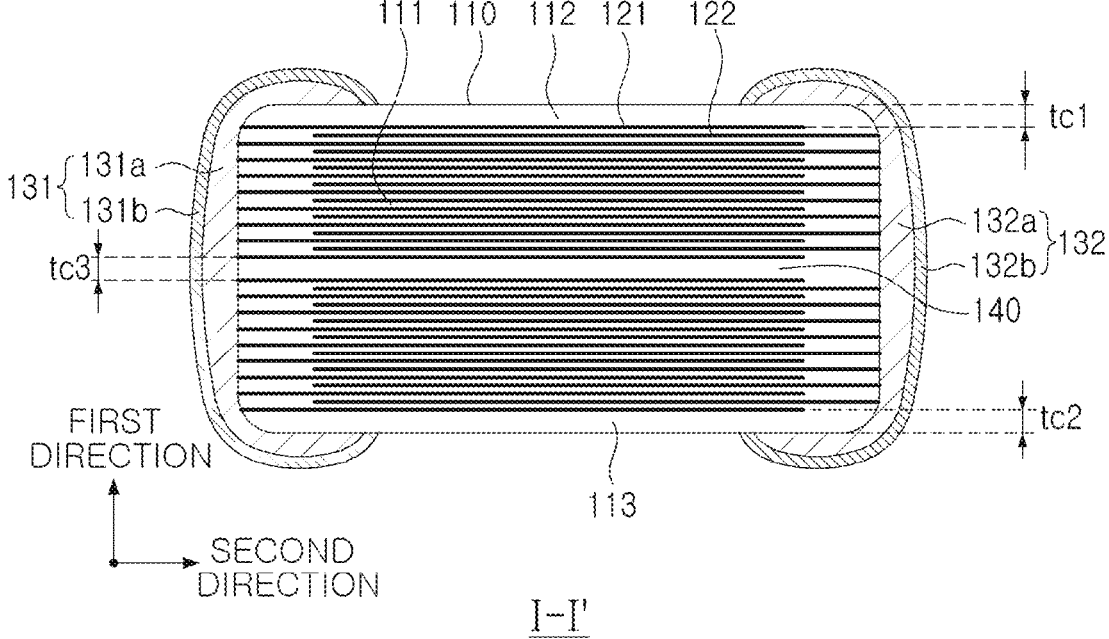
FIG. 2 is a cross-sectional view taken along line I-I' of FIG. 1.

FIG. 2 is a cross-sectional view taken along line I-I' of FIG. 1.

Figure 3:
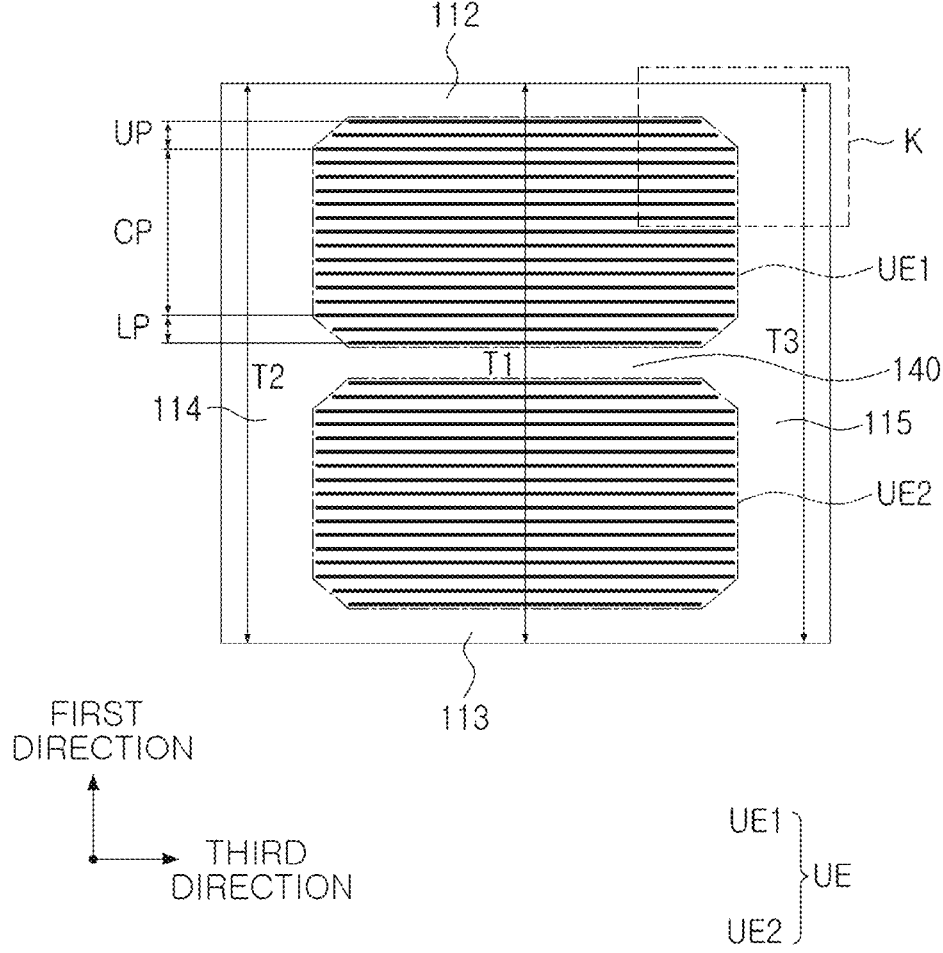
FIG. 3 is a cross-sectional view taken along line II-II' of FIG. 1.

FIG. 3 is a cross-sectional view taken along line II-II' of FIG. 1.

Figure 4:
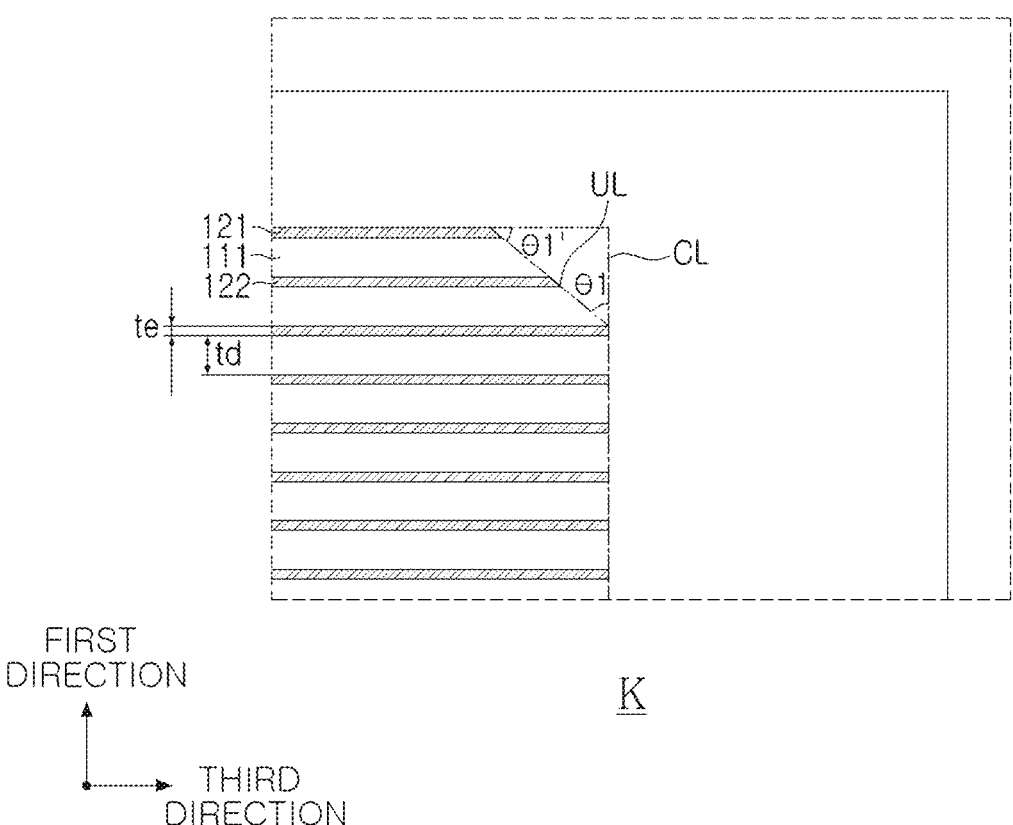
FIG. 4 is an enlarged view of region K of FIG. 2.

FIG. 4 is an enlarged view of region K of FIG. 2.

Hereinafter, a multilayer electronic component 100 according to an exemplary embodiment in the present disclosure will be described in detail with reference to FIGS. 1 through 4.

The multilayer electronic component 100 according to an exemplary embodiment in the present disclosure may include:

a body 110 including two or more unit electrode stacks UE1 and UE2 including a dielectric layer 111 and internal electrodes 121 and 122 alternately disposed with the dielectric layer in a first direction and including first and second surfaces 1 and 2 facing each other in the first direction, third and fourth surfaces 3 and 4 connected to the first and second surfaces and facing each other in a second direction, and fifth and sixth surfaces 5 and 6 connected to the first to fourth surfaces and facing each other in a third direction; and external electrodes 131 and 132 disposed on the body, wherein the two or more unit electrode stacks UE1 and UE2 are arranged in a line in the first direction, and in a cross-section of the unit electrode stack in the first and third directions, a width of the internal electrodes disposed in an upper portion UP and a lower portion LP of the unit electrode stack in the first direction is smaller than a width of the internal electrodes disposed in a central portion CP in the first direction, and when a line connecting ends of the internal electrodes disposed in the upper portion of the unit electrode stack in the first direction is UL, a line connecting ends of the internal electrodes disposed in the central portion CP in the first direction is CL, and a line connecting ends of the internal electrodes disposed in the lower portion LP in the first direction is LL, an acute angle between the CL and UL and an acute angle between the CL and LL may be 20 degrees to 70 degrees.

The internal electrodes, which provides an area for charging charges in the multilayer ceramic capacitor, which is a multilayer electronic component, are generally vertically stacked with the same overlapping pattern shape. Based on a cross-section of the general multilayer ceramic capacitor in the first and third directions, a triple point at which a capacitance forming portion in which the internal electrodes and the dielectric layer are alternately disposed, a cover portion, and a side margin portion contact each other is relatively vulnerable to cause a problem, such as cracks. In particular, during the sintering process, as sintering shrinkage first occurs in the thickness direction of the internal electrode, a phenomenon in which a central portion in the width direction is concave may occur, and stress due to sintering may be concentrated near the triple point at which the capacitance forming portion in which the internal electrodes and the dielectric layer are alternately disposed, the cover portion, and the side margin portion contact each other to cause cracks or the like.

Meanwhile, according to an exemplary embodiment in the present disclosure, the shape of the internal electrodes 121 and 122 included in the unit electrode stacks UE1 and UE2 are controlled and two or more unit electrode stacks UE1 and UE2 are arranged in the stacking direction (the first direction), thereby alleviating stress applied to the body to suppress the occurrence of cracks, delamination, etc. The stress applied to the body may include stress occurring due to a difference in shrinkage behavior between the internal electrodes and the dielectric layer, stress occurring when a voltage is applied, and stress applied by external factors.

Hereinafter, each component included in the multilayer electronic component 100 according to an exemplary embodiment in the present disclosure will be described.

Although the specific shape of the body 110 may not be particularly limited, the body 110 may have a hexahedral shape or a shape similar thereto as illustrated. Due to the shrinkage of ceramic powder included in the body 110 during a sintering process, the body 110 may not have a perfectly straight hexahedral shape but may have a substantially hexahedral shape.

The body 110 may have first and second surfaces 1 and 2 facing each other in the first direction, third and fourth surfaces connected to the first and second surfaces 1 and 2 and facing each other in the second direction, and fifth and sixth surfaces 5 and 6 connected to the first and second surfaces 1 and 2 and connected to the third and fourth surfaces 3 and 4 and facing each other in the third direction.

The plurality of dielectric layers 111 forming the body 110 are in a sintered state, and adjacent dielectric layers 110 may be integrated such that boundaries therebetween may not be readily apparent without using a scanning electron microscope (SEM). The number of stacked dielectric layers may not be particularly limited and may be determined in consideration of the size of the multilayer electronic component. For example, the body may be formed by stacking 400 or more dielectric layers.

The dielectric layer 111 is formed by preparing a ceramic slurry including ceramic powder, an organic solvent, and a binder, applying the slurry on a carrier film, and drying the slurry to prepare a ceramic green sheet, and then firing the ceramic green sheet. The ceramic powder may not be particularly limited as long as sufficient capacitance may be obtained, but, for example, barium titanate-based ($BaTiO_3$)-based powder may be used as the ceramic powder. For more specific examples, the ceramic powder may be one or more of $BaTiO_3$, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), and $Ba(Ti_{1-y}Zr_y)O_3$ ($0<y<1$). An average thickness td of the dielectric layer 111 may not be particularly limited, but may be, for example, 10 μm or less. In addition, the average thickness td of the dielectric layer 111 may be arbitrarily set according to desired characteristics or purposes.

However, when the average thickness td of the dielectric layer 111 is smaller than the average thickness te of the internal electrodes 121 and 122, the effect according to the present disclosure may be more remarkable.

In general, when the average thickness td of the dielectric layer 111 is smaller than the average thickness te of the internal electrodes 121 and 122, the internal electrodes 121 and 122 may be first sintered in the thickness direction during a sintering process, and thus, as the stress non-uniformity between the internal electrodes and the dielectric layer increases, stress due to sintering may increase. Meanwhile, in the case of the multilayer electronic component according to an exemplary embodiment in the present disclosure, the shape of the internal electrodes 121 and 122 included in the unit electrode stacks UE1 and UE2 may be controlled and two or more unit electrode stacks UE1 and UE2 are arranged in a line in the stacking direction (the first direction) to suppress stress due to sintering, so that the reliability of the multilayer electronic component may be improved even when the average thickness td of the dielectric layer 111 is smaller than the average thickness te of the internal electrodes 121 and 122.

Therefore, in an exemplary embodiment, the average thickness td of at least one of the dielectric layers 111 may be smaller than the average thickness te of the adjacent internal electrodes 121 and 122. In this case, the effect of suppressing stress according to the present disclosure may be more remarkable.

Here, the average thickness td of the dielectric layer 111 refers to a size of the dielectric layer 111 disposed between the internal electrodes 121 and 122 in the first direction. The average thickness of the dielectric layer 111 may be measured by scanning a cross-section of the body 110 in the first and second directions with a scanning electron microscope (SEM) with magnification of 10,000. More specifically, an average value may be measured by measuring the thicknesses at a plurality of points of one dielectric layer 111, for example, at 30 points equally spaced in the second direction. The 30 equally spaced points may be designated in a capacitance forming portion UE to be described later. In addition, an average value of the average thickness te of the adjacent internal electrodes 121 and 122 may be measured by measuring the thickness at a plurality of points of one internal electrode 121 and 122 in contact with the dielectric layer 111, for example, 30 equally spaced points in the second direction.

The body 110 may include two or more unit electrode stacks UE1 and UE2. For example, as shown in FIG. 3, the body 110 may include a first unit electrode stack UE1 and a second unit electrode stack UE2.

The unit electrode stacks UE1 and UE2 may include the dielectric layer 111 and the internal electrodes 121 and 122 alternately disposed with the dielectric layer in the first direction. In this case, a combination of regions in which the plurality of unit electrode stacks UE1 and UE2 are disposed may be referred to as a capacitance forming portion UE that contributes to the formation of capacitance formation of the capacitor.

Two or more unit electrode stacks UE1 and UE2 may be arranged in a line in the first direction. When the body 110 includes only one unit electrode stack, the stress relaxation effect according to the present disclosure may be insufficient. According to an exemplary embodiment in the present disclosure, as the two or more unit electrode stacks UE1 and UE2 are arranged in a line in the first direction, stress occurring in the central portion of the body 110 may also be suppressed to more effectively suppress the occurrence of cracks and delamination. In addition, it is possible to suppress a phenomenon in which the central portion of the body 110 in the width direction is concave, and the size of dielectric grains may be uniformly controlled.

Meanwhile, FIG. 3 illustrates that the body 110 includes two unit electrode stacks UE1 and UE2, but is not limited thereto. Referring to FIG. 5 schematically illustrating a cross-section of the multilayer electronic component in the first and third directions according to a modified example of the present disclosure, the body 110 may include the first unit electrode stack UE1, the second unit electrode stack UE2, and a third unit electrode stack UE3, and the three unit electrode stacks UE1, UE2, and UE3 may configure the capacitance forming portion UE. Furthermore, the body 110 may include four or more unit electrode stacks.

Referring to FIG. 3, in cross-section of the unit electrode stacks UE1 and UE2 in the first and third directions, the width of the internal electrodes disposed in the upper portion UP and the lower portion LP of the unit electrode stack in the first direction may be smaller than the width of the internal electrodes disposed on the central portion CP in the first direction. Accordingly, concentration of stress on the edge portions of the unit electrode stacks UE1 and UE2 may be suppressed, thereby securing a stress relaxation effect. Here, the width of the internal electrodes 121 and 122 may refer to the size of the internal electrodes 121 and 122 in the third direction.

In an exemplary embodiment, the width of the internal electrodes 121 and 122 disposed in the upper portion UP of the unit electrode stack in the first direction may decrease upwardly in the first direction, and the width of the internal electrodes 121 and 122 disposed in the lower portion LP of the unit electrode stack in the first direction may decrease downwardly in the first direction.

Also, the widths of the internal electrodes 121 and 122 disposed in the central portion CP of the unit electrode stack in the first direction may be substantially the same. Here, the fact that the widths of the internal electrodes 121 and 122 are substantially the same may mean that the internal electrodes 121 and 122 are formed by printing internal electrode patterns having a constant width and may mean that a difference between the widths of the internal electrodes is 10% or less in consideration of a manufacturing error or the like.

In an exemplary embodiment, the size of the central portion CP in the first direction within the unit electrode stack may be greater than the size in the first direction of the upper portion UP in the first direction and may be greater than the size in the first direction of the lower portion LP in the first direction. When the size of the central portion CP in the first direction within the unit electrode stack is small, capacitance per unit volume of the multilayer electronic component may decrease.

Although not limited thereto, as a more preferable example, the first directional size of the center portion CP in the first direction, compared to the first directional size of the unit electrode stacks UE1 and UE2 may be 0.4 or more and 0.8 or less. When the first directional size of the first directional central portion CP compared to the first directional size of the unit electrode stack is less than 0.4, the capacitance per unit volume may decrease, and when the size is greater than 0.8, the stress relaxation effect may be insufficient.

In an exemplary embodiment, in the cross-section of the unit electrode stacks UE1 and UE2 in the first and third directions, the unit electrode stacks UE1 and UE2 may have an octagonal shape. That is, a shape formed by a line connecting one end of each of the internal electrodes 121 and 122 in the width direction, a line connecting the other ends in the width direction, the uppermost internal electrodes 121 and 122 in the first direction, and the lowermost internal electrodes 121 and 122 in the first direction may be an octagonal shape.

Referring to FIG. 4, when a line connecting the ends of the internal electrodes 121 and 122 disposed in the upper portion UP in the first direction in the unit electrode stack is UL, a line connecting the ends of the internal electrodes disposed in the central portion UP in the first direction is CL, and a line connecting the ends of the internal electrodes 121 and 122 disposed in the lower portion LP in the first direction is LL, an acute angle θ1 formed by CL and UL and an acute angle formed by CL and LL may range from 20 degrees to 70 degrees. If the acute angle θ1 formed by CL and UL is less than 20 degrees or greater than 70 degrees, the stress relaxation effect may be insufficient. Also, when the acute angle formed by CL and LL is less than 20 degrees or greater than 70 degrees, the stress relaxation effect may be insufficient.

In addition, an acute angle θ1' formed by the line UL connecting the ends of the internal electrodes 121 and 122 disposed in the upper portion UP in the first direction within the unit electrode stack with respect to the third direction may be 20 degrees to 70 degrees.

In an exemplary embodiment, the body 110 may include an intermediate layer 140 disposed between adjacent unit electrode stacks UE1 and UE2. As shown in FIG. 3, the intermediate layer 140 may be disposed between the first unit electrode stack UE1 and the second unit electrode stack UE2. In addition, when there are three or more unit electrode stacks, a plurality of intermediate layers 140 may be disposed, and as shown in FIG. 7, an intermediate layer 140' may be disposed between the first unit electrode stack UE1 and the second unit electrode stack UE2 and between the second unit electrode stack UE2 and the third unit electrode stack UE3.

The intermediate layer 140 may improve withstand voltage characteristics by increasing a breakdown voltage (BDV), and may improve strength of the body 110. In addition, as the intermediate layer 140 is disposed between the adjacent unit electrode stacks UE1 and UE2, the stress relaxation effect according to the present disclosure may be more remarkable.

The intermediate layer 140 does not include internal electrodes and may include the same material as that of the dielectric layer 111. That is, the intermediate layer 140 may include a ceramic material, for example, a barium titanate (BaTiO₃)-based ceramic material.

The intermediate layer 140 may be formed by stacking one or more ceramic green sheets and firing them. That is, the intermediate layer 140 may be formed between the adjacent unit electrode stacks UE1 and UE2 by inserting a process of stacking one or more ceramic green sheets to which conductive paste for internal electrodes is not applied in the process of stacking the ceramic green sheets to which the conductive paste for internal electrodes is applied.

More specifically, the lower cover portion 113 may be stacked by stacking one or more ceramic green sheets, the second unit electrode stack UE2 may be stacked by stacking a plurality of ceramic green sheets to which the conductive paste for internal electrodes is applied, and then, the intermediate layer 140 may be stacked by stacking one or more ceramic green sheets. Thereafter, the first unit electrode stack UE1 may be stacked by stacking a plurality of ceramic green sheets to which conductive paste for internal electrodes is applied, and then, the upper cover portion 112 may be stacked by stacking ceramic green sheets, thereby preparing a stack.

In an exemplary embodiment, the body 110 may include the capacitance forming portion UE including two or more unit electrode stacks, the intermediate layer 140 disposed between adjacent unit electrode stacks, the upper cover portion 112 disposed in the upper portion of the capacitance forming portion UE in the first direction, and the lower cover portion 113 disposed in the lower portion of the capacitance forming portion in the first direction.

The upper cover portion 112 and the lower cover portion 113 may be formed by stacking a single dielectric layer or two or more dielectric layers on the upper and lower surfaces of the capacitance forming portion Ac in the thickness direction, respectively, and may basically serve to prevent damage to the internal electrode due to are physical or chemical stress.

The upper cover portion 112 and the lower cover portion 113 may not include internal electrodes and may include the same material as the dielectric layer 111.

That is, the upper cover portion 112 and the lower cover portion 113 may include a ceramic material, for example, a barium titanate (BaTiO₃)-based ceramic material.

In an exemplary embodiment, when the average thickness of the upper cover portion 112 is tc1, the average thickness of the lower cover portion 113 is tc2, $0.9 \leq tc1/tc2 \leq 1.1$ may be satisfied. Since stress applied to the body may be concentrated on one side as a thickness difference between the upper cover portion 112 and the lower cover portion 113 increases, when $0.9 \leq tc1/tc2 \leq 1.1$ is satisfied, the stress relaxation effect of the present disclosure may be more remarkable.

In addition, when the average thickness of the upper cover portion 112 is tc1, the average thickness of the lower cover portion 113 is tc2, and the average thickness of the intermediate layer 140 is tc3, $0.1*(tc1+tc2)/2 \leq tc3 \leq (tc1+tc2)/2$ may be satisfied. That is, the average thickness tc3 of the intermediate layer 140 may be less than or equal to the average value of tc1 and tc2 and may be 0.1 times or more of the average value of tc1 and tc2. By satisfying the above conditions, the stress applied to the body may be effectively relaxed, without excessively reducing the capacitance of the multilayer electronic component.

In an exemplary embodiment, when the average thickness of the dielectric layer 111 is td, the average thickness of the upper cover portion 112 is tc1, the average thickness of the lower cover portion 113 is tc2, and the average thickness of the intermediate layer 140 is tc3, td<tc3, tc3≤tc1 and tc3≤tc2 may be satisfied. By satisfying the above conditions, the stress applied to the body may be effectively relaxed, without excessively reducing the capacitance of the multilayer electronic component.

Meanwhile, specific values of the average thickness tc1 of the upper cover portion 112 and the average thickness tc2 of the lower cover portion 113 may not be particularly limited, but tc1 and tc2 may each be 15 um or less, to easily achieve miniaturization and high capacitance of the multilayer electronic component.

In addition, the specific value of the average thickness tc3 of the intermediate layer 140 may not be particularly limited. For example, the average thickness of the intermediate layer

140 may be three times or more of the average thickness td of the dielectric layer, but is not limited thereto.

The average thickness of the intermediate layer 140 and the upper and lower cover portions 112 and 113 may refer to the size in the first direction, and may be an average value of the sizes in the first direction measured at five equally spaced points in the third direction. Meanwhile, when a plurality of intermediate layers 140 are disposed, it may refer to an average thickness of each of the plurality of intermediate layers 140.

In addition, margin 114 and 115 may be disposed on the side of the capacitance forming portion UE.

The margin portions 114 and 115 may include a first margin portion 114 disposed on the fifth surface 5 of the body 110 and a second margin portion 115 disposed on the sixth surface 6 of the body 110. That is, the margin portions 114 and 115 may be disposed on both end surfaces of the ceramic body 110 in the width direction.

As shown in FIG. 3, the margin portions 114 and 115 may refer to regions between both ends of the first and second internal electrodes 121 and 122 in a cross-section of the body 110 cut in the width-thickness (W-T) direction and a boundary surface of the body 110.

The margin portions 114 and 115 may basically serve to prevent damage to the internal electrode due to physical or chemical stress.

The margin portions 114 and 115 may be formed by forming internal electrodes by applying a conductive paste on the ceramic green sheet except a portion in which the margin portion is to be formed.

In addition, in order to suppress a step difference caused by the internal electrodes 121 and 122, after stacking, the internal electrodes may be cut to be exposed to the fifth and sixth surfaces 5 and 6 of the body, and then a single dielectric layer or two or more dielectric layers may be stacked on both side surfaces of the capacitance forming portion UE in the third direction (the width direction) to form the margin portions 114 and 115.

Meanwhile, the width of the margin portions 114 and 115 may not be particularly limited. However, the average width of the margin portions 114 and 115 may be 15 μm or less in order to more easily achieve miniaturization and high capacitance of the multilayer electronic component.

The average width of the margin portions 114 and 115 may refer to an average size of a region in which the internal electrodes are spaced apart from the fifth surface in the third direction and an average size of a region in which the internal electrodes are spaced apart from the sixth surface in the third direction, and may be a value obtained by averaging sizes of the margin portions 114 and 115 in the third direction measured at five equally spaced points on the side of the capacitance forming portion UE.

Therefore, in an exemplary embodiment, the average size of the regions in which the internal electrodes 121 and 122 are spaced apart from the fifth and sixth surfaces in the third direction may be 15 μm or less.

In an exemplary embodiment, when the size of the body in the first direction at the central portion of the body in the third direction is T1, the size of the body in the first direction at one end of the body in the third direction is T2, and the size of the body in the first direction at the other end of the body in the third direction is T3, $[1-2*T1/(T2+T3)]*100$ may be less than 3.8. More preferably, $[1-2*T1/(T2+T3)]*100$ may be 2.3 or less.

During the sintering process, as sintering shrinkage occurs first in the thickness direction of the internal electrode, a phenomenon in which the central portion of the body in the width direction becomes concave may occur. According to the present disclosure, by controlling the shape of the internal electrodes 121 and 122 included in the unit electrode stacks UE1 and UE2 and arranging two or more unit electrode stacks UE1 and UE2 in a line in the first direction, sintering shrinkage matching between the internal electrodes, the cover portions, and the margin portions may be improved, thereby suppressing the phenomenon in which the central portion of the body in the width direction becomes concave. Accordingly, $[1-2*T1/(T2+T3)]*100$ may be less than 3.8.

Meanwhile, a lower limit of $[1-2*T1/(T2+T3)]*100$ may not be particularly limited, but may be preferably 0 or more.

T1, T2, and T3 may be measured by observing a cross-section of the body 110 cut in the first and third directions at the central portion of the body 110 in the second direction using an optical microscope or the like. T2 may be the size of the fifth surface of the body in the first direction in the cross-section cut in the first and third directions, and T3 may be the size of the sixth surface of the body in the first direction.

In an exemplary embodiment, a coefficient of variation CV of the size of dielectric grains included in the dielectric layer may be less than 0.52. More preferably, the coefficient of variation CV of the size of dielectric grains included in the dielectric layer may be 0.46 or less.

The coefficient of variation CV of the size of the dielectric grains included in the dielectric layer may be measured from an image of the cross-section of the body in the first and third directions cut in the center of the body in the second direction by a scanning electron microscope (SEM) at magnification of 20000 fold or greater.

Specifically, after selecting 250 dielectric grains included in the dielectric layer disposed in central portion CP in the first direction in the unit electrode stack and measuring the size of the dielectric grains, the average value GS of the 250 dielectric grain sizes and the standard deviation OGS may be obtained, and then, OGS/GS may be set as the coefficient of variation of the size of dielectric grains. Here, the standard deviation OGS may be calculated by subtracting GS from each size of the 250 dielectric grains, squaring them, calculating an average value of these values to obtain a variance, and then taking the square root of the variance value.

The internal electrodes 121 and 122 may include first and second internal electrodes 121 and 122. The first and second internal electrodes 121 and 122 may be alternately disposed to face each other with the dielectric layer 111 constituting the body 110 interposed therebetween, and may be exposed to the third and fourth surfaces 3 and 4 of the body 110, respectively.

The first internal electrode 121 may be spaced apart from the fourth surface 4 and exposed through the third surface 3, and the second internal electrode 122 may be spaced apart from the third surface 3 and exposed through the fourth surface 4. The first external electrode 131 may be disposed on the third surface 3 of the body and connected to the first internal electrode 121, and the second external electrode 132 may be disposed on the fourth surface 4 of the body and connected to the second internal electrode 122.

That is, the first internal electrode 121 may not be connected to the second external electrode 132 but be connected to the first external electrode 131, and the second internal electrode 122 may not be connected to the first external electrode 131 but be connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance. Also, the first and second internal electrodes 121 and 122 may be spaced apart from the fifth and sixth surfaces of the body 110.

The conductive metal included in the internal electrodes 121 and 122 may be at least one of Ni, Cu, Pd, Ag, Au, Pt, In, Sn, Al, Ti, and alloys thereof, but the present disclosure is not limited thereto.

The internal electrodes 121 and 122 may be formed by applying a conductive paste for internal electrodes including a conductive metal with a predetermined thickness on a ceramic green sheet and firing it.

As a method of applying the conductive paste for internal electrodes, a screen printing method or a gravure printing method may be used, but the present disclosure is not limited thereto.

Meanwhile, in order to control the width of the internal electrodes for each position within the unit electrode stack, the width of the internal electrode pattern printed on the ceramic green sheet may be adjusted. That is, the internal electrode patterns forming the internal electrodes 121 and 122 disposed in the central portion CP in the first direction within the unit electrode stack may be printed with the same width. The internal electrodes 121 and 122 disposed in the upper portion UP and the lower portion LP in the first direction within the unit electrode stack may be formed by using several ceramic green sheets in which the width of the internal electrode pattern is printed to be gradually decreased.

The average thickness te of the internal electrode may not be particularly limited. In this case, the thickness of the internal electrodes 121 and 122 may refer to the size of the internal electrodes 121 and 122 in the first direction. However, as described above, in an exemplary embodiment, the average thickness td of at least one of the dielectric layers 111 may be smaller than the average thickness te of the adjacent internal electrodes 121 and 122. In this case, the stress relaxation effect according to the present disclosure may be more remarkable.

Here, the average thickness te of the internal electrodes may be measured by scanning a cross-section of the body 110 in the first and second directions with a scanning electron microscope (SEM) at a magnification of 10,000. More specifically, the average value may be measured by measuring the thickness at a plurality of points of one internal electrode 121 or 122, for example, at 30 points equally spaced in the second direction. The 30 equally spaced points may be designated in the capacitance forming portion UE.

The external electrodes 131 and 132 may be disposed on the third and fourth surfaces 3 and 4 of the body 110.

The external electrodes 131 and 132 may include the first and second external electrodes 131 and 132 disposed on the third and fourth surfaces 3 and 4 of the body 110 and connected to the first and second internal electrodes 121 and 122, respectively.

Referring to FIG. 1, the external electrodes 131 and 132 may be disposed to cover both end surfaces of the side margin portions 114 and 115 in the second direction.

In the present exemplary embodiment, a structure in which the multilayer electronic component 100 has two external electrodes 131 and 132 is described, but the number or shape of the external electrodes 131 and 132 may be changed depending on the shape of the internal electrodes 121 and 122 or other purposes.

Meanwhile, the external electrodes 131 and 132 may be formed using any material as long as the material has electrical conductivity, such as metal, and a specific material may be determined in consideration of electrical characteristics, structural stability, and the like, and the external electrodes 131 and 132 may further have a multilayer structure.

For example, the external electrodes 131 and 132 may include electrode layers 131a and 132a disposed on the body 110 and plating layers 131b and 132b formed on the electrode layers 131a and 132a.

As a more specific example of the electrode layers 131a and 132a, the electrode layers 131a and 132a may be fired electrodes including conductive metal and glass or resin-based electrodes including conductive metal and a resin.

In addition, the electrode layers 131a and 132a may have a form in which a fired electrode and a resin-based electrode are sequentially formed on the body. In addition, the electrode layers 131a and 132a may be formed by transferring a sheet including a conductive metal onto a body or by transferring a sheet including a conductive metal onto a fired electrode.

A material having excellent electrical conductivity may be used as the conductive metal included in the electrode layers 131a and 132a, and may not be particularly limited. For example, the conductive metal may be at least one of nickel (Ni), copper (Cu), and alloys thereof.

The plating layers 131b and 132b serve to improve mounting characteristics. The type of the plating layers 131b and 132b may not be particularly limited, and may be plating layers including at least one of Ni, Sn, Pd, and alloys thereof, and may be formed of a plurality of layers.

For a more specific example of the plating layers 131b and 132b, the plating layers 131b and 132b may be Ni plating layers or Sn plating layers, and may have a form in which an Ni plating layer and an Sn plating layer are sequentially formed on the electrode layers 131a and 132a, or may have a form in which a Sn plating layer, a Ni plating layer, and a Sn plating layer are sequentially formed. In addition, the plating layers 131b and 132b may include a plurality of Ni plating layers and/or a plurality of Sn plating layers.

Example

As Inventive Example, a sample including the first unit electrode stack UE1 and the second unit electrode stack UE as shown in FIG. 3 was prepared. As Comparative Example 1, a sample having a conventional general capacitance forming portion UE" as shown in FIG. 6 was prepared. In Comparative Example 2, a sample in which a capacitance forming portion UE''' is formed to include two unit electrode stacks UE1'''' and UE2'''', but the widths of the internal electrodes disposed in the upper portion, the central portion, and the lower portion within the unit electrode stacks UE1''' and UE2''' are the same shown in FIG. 7 was prepared.

Concave rate, crack occurrence rate, and dielectric grain size for Inventive Example, Comparative Example 1, and Comparative Example 2 were measured and listed in Table 1 below.

The concave rate was calculated as $[1-2*T1/(T2+T3)]*100$, and the average value and standard deviation measured from each of 20 samples of Inventive Example, Comparative Example 1, and Comparative Example 2 were described. Specifically, a cross-section cut in the first and third directions at the central portion of each sample in the second direction was observed with an optical microscope, $[1-2*T1/(T2+T3)]*100$ was obtained by measuring the size T1 of each sample in the first direction at the central portion in the third direction of each sample, the size T2 in the first direction at one end in the third direction, and the size T3 in the first direction at the other end in the third direction, and then, average values and standard deviations of the values were calculated.

As for the crack occurrence rate, a cross-section of each of 300 samples of each of Inventive Example, Comparative Example 1, and Comparative Example 2 cut in the first and second directions in the central portion of each sample in the second direction was observed with an optical microscope to visually observe whether cracks occurred, and the number of cracked samples was described.

The dielectric grain size was measured in one sample of each of Inventive Example, Comparative Example 1, and Comparative Example 2, and measured from an image of a cross-section of each sample cut in the first and third directions at the central portion of the sample in the second direction using a scanning electron microscope (SEM) at a magnification of 20,000. In the case of Inventive Example and Comparative Example 2, 250 dielectric grains included in the dielectric layer disposed in the central portion in the first direction in the first unit electrode stack UE1 and UE1''' were selected and sizes thereof were measured, and in the case of Comparative Example 1, 250 dielectric grains included in the dielectric layer disposed in the central portion in the first direction in the capacitive forming portion UE'' were selected and sizes thereof were measured.

TABLE 1

| Classification | | Comparative Example 1 | Comparative Example 2 | Inventive Example |
|---|---|---|---|---|
| Concave rate | Average value | 6.2% | 3.8% | 2.3% |
| | Standard deviation | 0.31% | 0.26% | 0.20% |
| Crack occurrence rate | | 87/300 | 61/300 | 0/300 |
| Size of dielectric grain | Average value | 206.41 nm | 177.66 nm | 174.23 nm |
| | Standard deviation | 114.71 nm | 93.14 nm | 80.95 nm |
| | Coefficient of variation | 0.56 | 0.52 | 0.46 |

Referring to Table 1, it can be seen that the concave rate of Inventive Example was reduced compared to Comparative Example 1 and Comparative Example 2, and in particular, in the case of the crack occurrence rate, Inventive Example had no cracked sample out of 300 samples.

In the case of the dielectric grain size, the average value of the dielectric grain size of Inventive Example was the lowest, and the values of the standard deviation and coefficient of variation were also the lowest, confirming that Inventive Example had dielectric grains having a uniform size, compared to Comparative Example 1 and Comparative Example 2.

As one of the various effects of the present disclosure, the reliability of the multilayer electronic component may be improved by controlling the shape of the internal electrodes included in the unit electrode stack and arranging two or more unit electrode stacks in a line in the first direction.

As one of the various effects of the present disclosure, stress applied to the body may be suppressed by controlling the shape of the internal electrodes included in the unit electrode stack and arranging two or more unit electrode stacks in a line in the first direction.

As one of the various effects of the present disclosure, a phenomenon in which the central portion of the body in the width direction becomes concave may be suppressed.

As one of the various effects of the present disclosure, the occurrence of cracks and delamination may be suppressed.

As one of the various effects of the present disclosure, the size of dielectric grains may be uniformly controlled.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including two or more unit electrode stacks, each unit electrode stack including a dielectric layer and internal electrodes alternately disposed with the dielectric layer in a first direction and the body including first and second surfaces facing each other in the first direction, third and fourth surfaces connected to the first and second surfaces and facing each other in a second direction, and fifth and sixth surfaces connected to the first to fourth surfaces and facing each other in a third direction; and
external electrodes disposed on the body,
wherein the two or more unit electrode stacks are arranged in a line in the first direction, and
in a cross-section of each unit electrode stack in the first and third directions,
a width of internal electrodes disposed in an upper portion of each unit electrode stack in the first direction among the internal electrodes and a width of internal electrodes disposed in a lower portion of each unit electrode stack in the first direction among the internal electrodes are smaller than a width of internal electrodes disposed in a central portion in the first direction among the internal electrodes, and
wherein an acute angle ($\theta_1$) between a CL representing a line connecting ends of the internal electrodes disposed in the central portion of each unit electrode stack in the first direction and a UL representing a line connecting ends of the internal electrodes disposed in the upper portion of each unit electrode stack in the first direction and a separate acute angle ($\theta_2$) between the CL and a LL representing a line connecting ends of the internal electrodes disposed in the lower portion of each unit electrode stack in the first direction are each 20 degrees to 70 degrees.

2. The multilayer electronic component of claim 1, wherein an acute angle between the UL and a line representing the third direction is 20 degrees to 70 degrees.

3. The multilayer electronic component of claim 1, wherein the width of the internal electrodes disposed in the upper portion of each unit electrode stack in the first direction decreases upwardly in the first direction, and
the width of the internal electrodes disposed in the lower portion in the first direction within each unit electrode stack decreases downwardly in the first direction.

4. The multilayer electronic component of claim 1, wherein the internal electrodes disposed in the central portion in the first direction within the unit electrode stack have substantially same widths.

5. The multilayer electronic component of claim 1, wherein, in each unit electrode stack, a size in the first direction of the central portion of each unit electrode stack in the first direction is greater than a size in the first direction of the upper portion of each unit electrode stack in the first direction and is greater than a size in the first direction of the lower portion of each unit electrode stack in the first direction.

6. The multilayer electronic component of claim 1, wherein the body includes an intermediate layer disposed between the two or more unit electrode stacks adjacent to each other.

7. The multilayer electronic component of claim 6, wherein an average thickness of the intermediate layer is three times or more of an average thickness of the dielectric layer.

8. The multilayer electronic component of claim 1, wherein the body includes a capacitance forming portion including the two or more unit electrode stacks, an intermediate layer disposed between adjacent unit electrode stacks of the two or more unit electrode stacks, an upper cover portion disposed on an upper portion of the capacitance forming portion in the first direction, and a lower cover portion disposed on a lower portion of the capacitance forming portion in the first direction.

9. The multilayer electronic component of claim 8, wherein $0.9 \leq tc1/tc2 \leq 1.1$, the tc1 is an average thickness of the upper cover portion and the tc2 is an average thickness of the lower cover portion.

10. The multilayer electronic component of claim 8, wherein $0.1*(tc1+tc2)/2 \leq tc3 \leq (tc1+tc2)/2$, the tc1 is an average thickness of the upper cover portion, the tc2 is an average thickness of the lower cover portion, and the tc3 is an average thickness of the intermediate layer.

11. The multilayer electronic component of claim 8, wherein $td<tc3$, $tc3 \leq tc1$ and $tc3 \leq tc2$, the td is an average thickness of the dielectric layer, the tc1 is an average thickness of the upper cover portion, the tc2 is an average thickness of the lower cover portion, and the tc3 is an average thickness of the intermediate layer.

12. The multilayer electronic component of claim 1, wherein $[1-2*T1/(T2+T3)]*100$ is less than 3.8, the T1 is a size of the body in the first direction at a central portion of the body in the third direction, the T2 is a size of the body in the first direction at one end of the body in the third direction, and the T3 is a size of the body in the first direction at the other end of the body in the third direction.

13. The multilayer electronic component of claim 1, wherein a coefficient of variation of a size of a dielectric grain included in the dielectric layer is less than 0.52.

14. A multilayer electronic component comprising:
a body including two or more unit electrode stacks, each unit electrode stack including a dielectric layer and internal electrodes alternately disposed with the dielectric layer in a first direction and the body including first and second surfaces facing each other in the first direction, third and fourth surfaces connected to the first and second surfaces and facing each other in a second direction, and fifth and sixth surfaces connected to the first to fourth surfaces and facing each other in a third direction; and external electrodes disposed on the body, wherein the two or more unit electrode stacks are arranged in a line in the first direction, and in a cross-section of each unit electrode stack in the first and third directions, a line connecting one end of each of the internal electrodes included in each unit electrode stack in a width direction, a line connecting the other end of each of the internal electrodes in the width direction, an uppermost internal electrode in the first direction, and a lowermost internal electrode in the first direction form an octagonal shape having eight sides defined by intersecting line segments connecting the ends of the internal electrodes.

15. The multilayer electronic component of claim 14, wherein in the cross-section of the unit electrode stack in the first and third directions, width of internal electrodes disposed in an upper portion of each unit electrode stack among the internal electrodes in the first direction decreases upwardly in the first direction, width of internal electrodes disposed in a lower portion of each unit electrode stack among the internal electrodes in the first direction decreases downwardly in the first direction, and widths of internal electrodes disposed in a central portion of each unit electrode stack among the internal electrodes in the first direction are substantially the same.

16. The multilayer electronic component of claim 15, wherein the body includes a capacitance forming portion including the two or more unit electrode stacks, an intermediate layer disposed between adjacent unit electrode stacks of the two or more unit electrode stacks, an upper cover portion disposed on a upper portion of the capacitance forming portion in the first direction, and a lower cover portion disposed on a lower portion of the capacitance forming portion in the first direction, and $td<tc3$, $tc3 \leq tc1$ and $tc3 \leq tc2$, the td is an average thickness of the dielectric layer, the tc1 is an average thickness of the upper cover portion, the tc2 is an average thickness of the lower cover portion, and the tc3 is an average thickness of the intermediate layer.

\* \* \* \* \*